United States Patent [19]
Bayer et al.

[11] 3,775,649
[45] Nov. 27, 1973

[54] METHOD AND APPARATUS FOR THE OPERATION OF AN AUTOMATICALLY CONTROLLED SYNCHRONOUS MACHINE

[75] Inventors: Karl-Heinz Bayer, Erlangen; Hermann Waldmann, Weiher; Manfred Weibelzahl, Erlangen, all of Germany

[73] Assignee: Siemens Aktiengesellschaft, Munich, Germany

[22] Filed: June 27, 1972

[21] Appl. No.: 266,643

[30] Foreign Application Priority Data
June 29, 1971  Germany.................. P 21 32 178.8

[52] U.S. Cl............................... 318/188, 318/227
[51] Int. Cl............................................. H02p 7/36
[58] Field of Search.................. 318/227, 171, 175, 318/188

[56] References Cited
UNITED STATES PATENTS

| | | | |
|---|---|---|---|
| 3,375,422 | 3/1968 | Boudigues...................... | 318/175 X |
| 3,612,970 | 10/1971 | Sofan.................................. | 318/175 |
| 3,694,716 | 9/1972 | Eland.................................. | 318/175 |

*Primary Examiner*—B. Dobeck
*Attorney*—Hugh A. Chapin

[57] ABSTRACT

The operation of an automatically controlled synchronous machine is controlled by controlling the vector of the stator current circulation by means of two components which can be varied independently of each other. One of these components, namely, the torque-generating component, is always perpendicular to the axis of the rotating field, and the other, the field-generating component, always parallel to the axis of the rotating field. In a drive of this type, which is particularly well suited for a transmissionless cement mill, full torque at stand-still, starting without chatter and full utilization at rated operation are obtained.

17 Claims, 9 Drawing Figures

Fig. 1

T.C. = TRANSFORMATION CIRCUIT

METHOD AND APPARATUS FOR THE OPERATION OF AN AUTOMATICALLY CONTROLLED SYNCHRONOUS MACHINE

FIELD OF THE INVENTION

The present invention concerns a method and apparatus for the operation of a converter-fed, automatically controlled synchronous machine, particularly for a transmissionless cement mill drive.

BACKGROUND OF THE INVENTION

A converter-fed synchronous motor for a transmission-less cement mill drive has been known, for example, as described in the magazine Brown-Boveri Mitteilungen, 1970, p. 121 to 129, which, through automatic control, is provided in principle with the same control behavior as a d-c commutator motor, without being subject to the limitations imposed by the use of a mechanical commutator. In this known drive, the amplitude of the stator current is used as the principal controlled quantity and the angle between the vector of the stator current circulation and the rotor as well as the excitation current are adjusted as a function of the preset stator amplitude by means of function generators in such a manner that the resulting linking of the stator flux always remains at its nominal value and the current and the voltage of the stator are always in phase with respect to each other. The motor has therefore carried no reactive current. However, these conditions can be fulfilled only by means of two exactly matched function generators, and only in the stationary state of the machine as a coupling between the field and the stator current during transition from one stationary condition to another leads to overvoltages or rotor oscillations. A further limitation of this known arrangement resides in the fact that it permits basically only operation with $\cos \varphi = 1$ whereas it is frequently desirable to deviate from this condition in order to make a maximum torque of the machine available or to prevent overvoltages in the event of load shocks.

Accordingly, it is an object of the invention to provide an improved technique from the dynamic point of view for controlling or regulating a converter-fed, automatically controlled synchronous machine, in which the active as well as the reactive component of the stator current, i.e., its torque-generating and its field-generating components, can be preset directly and independently of each other.

SUMMARY OF THE INVENTION

Briefly, the invention provides a method and apparatus by which the two components which determine the instantaneous position of the rotating-field axis are ascertained directly, or by means of a field simulation, and the vector of the stator current circulation is preset by means of two reference components which can be varied independently of each other. These latter reference components are such that one is always perpendicular and the other always parallel to the axis of the rotating field.

If the rotating field or the position of the axis of the rotating field, respectively, is not to be ascertained directly, a coordinate system referenced to the rotor can be advantageously used for the purpose of field simulation in order to work with more easily processed equalities. According to a further feature of the invention, this is achieved by forming two rotor-referenced stator current components from two orthogonal components determining the instantaneous position of the rotor axis and two stator-referenced orthogonal stator current components. The tow rotor-referenced orthogonal components are then transferred by means of field simulation, into two rotor-referenced orthogonal field components which are combined with two rotor position components to form two stator-referenced orthogonal components which determine the instantaneous position of the axis of the rotating field. Thus, a biaxial forward and back transformation of the input and output quantities of the field simulation take place.

According to a further embodiment of the invention, a vector rotator can be used in the above-mentioned component transformations, which consists of two summing amplifiers and four multipliers, the outputs of which are connected in pairs with the input of one amplifier each.

In one embodiment, the field simulation can be made with a minimum of amplifiers by use of two differential amplifiers with negative resistor feedback, one of which is driven by the stator current component lying in the direction of the rotor axis and a signal quantity proportional to the excitation current, and the other by the stator current component which is perpendicular to the rotor axis. For synchronous machines equipped with damper windings, negative-feedback branches are provided each of which connects the output of a differential amplifier with its input and consists of a capacitor in series with a resistor. If saturation of the machine is to be taken into consideration, the output signals of the differential amplifiers can, according to another feature of the invention, be squared, summed and fed to a threshold stage, the output signal of which drives a multiplier arranged in a further feedback circuit of each differential amplifier.

According to a further feature of the invention, the preset component which is perpendicular to the axis of the rotating field is determined by the output signal of a speed control for the purpose of speed control. In order to assure constant gain, i.e., for adaption purposes, the preset component which is perpendicular to the axis of the rotating field is the output signal of a quotient generator whose dividend input is connected with the speed control and whose divisor input is driven by a quantity which is proportional to the absolute value of the rotating-field vector.

According to a further embodiment of the invention, in order to keep the excitation constant, regardless of the mechanical load of the synchronous machine, a flux control is provided. This flux control is fed, as the actual value, a quantity proportional to the absolute value of the rotating-field vector. In order to improve the dynamics of the flux control, it is advisable in this connection if an excitation current regulator is subordinated to the flux control.

According to a further embodiment of the invention, the input signal of the excitation current regulator determines the preset component that is parallel to the axis of the field in order to assist the excitation current regulator in the event of a rapid build-up or decay of the field.

DESCRIPTION OF THE PREFERRED EMBODIMENT

Figure 1:
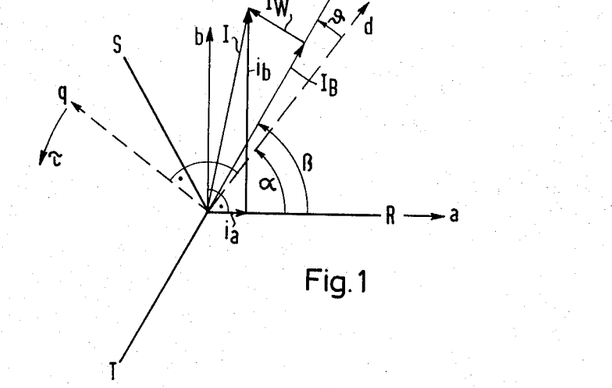
FIG. 1 illustrates a vector diagram of the stator winding axes of a three-phase synchronous machine.

Referring to FIG. 1, the stator winding axes of a three-phase synchronous machine are designated R, S and T. At a particular instant of time, the axis P of a rotor rotating in the direction indicated by the arrow forms an angle $\alpha$ with the axis of the stator winding R within a stationary orthogonal coordinate system having axes $b$ and $a$, wherein the axis $a$ coincides with the stator winding axis R. At the same instant, the instantaneous position of the likewise revolving rotating field axis F is indicated by an angle $\beta$. Also, the rotating vector of the stator current circulation I is disposed within a second orthogonal coordinate system having axes $d$ and $q$, wherein the axis $d$ coincides with the rotating rotor axis P. The stator current circulation can thus be defined by two field-oriented components $I_W$ and $I_B$, with component $I_W$ always being perpendicular to the field axis F while the component $I_B$ is always in the direction of the field axis F. Further, in the stator referenced coordinate system $a$, $b$, the stator current circulation is defined by the components $i_a$ and $i_b$. The component $I_W$ represents the torque-generating component and $I_W$, the field-generating component of the stator current. For an operational state in which $\cos \varphi = 1$, $I_B$ would have the value 0, and the stator current would accordingly be a purely active current.

Figure 2:
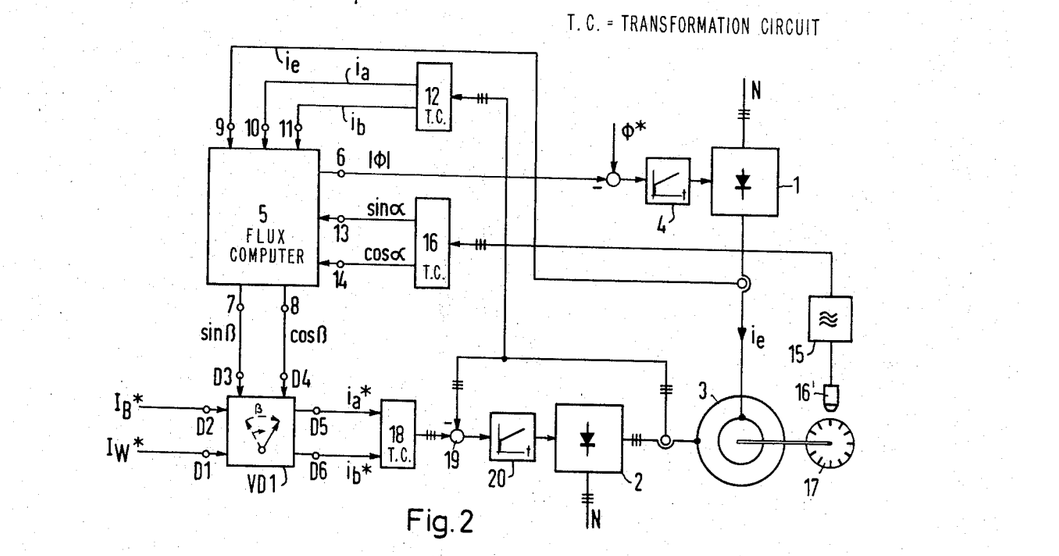
FIG. 2 illustrates a block diagram of a field-oriented control system according to the invention.

Referring to FIG. 2, a three-phase system N feeds, via controlled converters 1, 2, the rotor and the stator windings of a synchronous machine 3. The control line of the converter 1 feeding the rotor are acted upon by a flux control 4 into which a constant quantity $\phi^*$ is set as a reference value. A flux computer 5, described below, supplies, via a terminal 6, a quantity which is proportional to the absolute value $|\phi|$ of the rotating-field vector as the actual value for the flux control 4 while also supplying, via terminals 7, 8, two component voltages, designated $\sin\beta$ and $\cos\beta$, which define the instantaneous position of the rotating-field axis (F) in the stator reference coordinate system $a$, $b$. In order to effect this, the flux computer 5 is fed with the following input quantities:

at terminal 9, a quantity proportional to the excitation current $i_e$;

at terminals 10 and 11, two stator-referenced orthogonal stator current components $i_a$ and $i_b$ which are obtained from the three stator phase currents by means of a transformation circuit 12; and at terminals 13 and 14, two components $\sin \alpha$ and $\cos \alpha$ which define the respective rotor position $p$ in the stator-referenced coordinate system $a$, $b$ and which are supplied by a digitally operating three-phase generator 15 via a further transformation circuit 16. The digital three-phase generator 15 is known per se and is described, for instance, in the German published Patent application 1,563,741. This generator 15 consists essentially of a counter, a stepping switch, a distribution gate and a digital-to-analog converter system and delivers three sinusoidal output voltages which are shifted 120 electrical degrees with respect to each other and whose period is inversely proportional to the frequency of an input pulse sequence fed thereto. The digital three-phase generator 15 is fed on the input side from a galvano-magnetic (magneto-resistive) pulse generator 16', for instance, in the form of a "field plate" or a Hall effect generator, which is actuated in turn by a pulse disc 17 coupled with the rotor of the synchronous machine 3 and in whose periphery small permanent magnets are embedded at regular intervals, the number of which is an integral multiple of the number of poles of the synchronous machine 3.

The system N also includes a vector rotator VD1 having terminals D1 and D2 to which are delivered two reference signals $I_W^*$ and $I_B^*$ which can be preset at will for the field-oriented stator current components $I_W$ and $I_B$ (see FIG. 1). Two other input terminals D3 and D4 of the vector rotator VD1 are connected with the output terminals 7 and 8 of the flux computer 5 to receive the components $\sin \beta$ and $\cos \beta$ which determine the position of the axis (F) of the rotating field. As indicated in block symbol, the vector rotator VD1 advances the input vector described by the quantities $I_W$ and $I_B$ by the angle $\beta$, i.e., the vector rotator VD1 represents the following relation between field-referenced and stator-referenced preset values, which can be derived from FIG. 1:

$$i_a^* = I_B^* \cos \beta - I_W^* \sin\beta$$

$$i_b^* = I_B^* \sin \beta + I_W^* \cos \beta$$

The stator-referenced preset values $i_a^*$ and $i_b^*$ which appear at the two output terminals D5 and D6 of the vector rotator VD1, are transformed via a transformation circuit 18 into three phase-current reference values and are compared in the mixing stages 19 with the three corresponding actual values of the stator current. Three correspondingly associated phase current regulators 20, of which only one is shown for the sake of simplicity, then bring about agreement between the actual values and the reference values.

Figure 3:
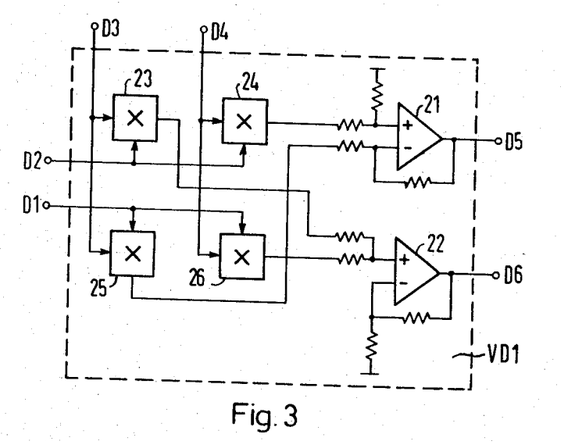
FIG. 3 illustrates a circuit diagram of a vector rotating according to the invention.

Referring to FIG. 3, the vector rotator VD1 consists of two summing amplifiers 21 and 22, which are fed the output voltages from four multipliers 23 to 26. All resistors connected to the inputs, respectively marked with − and +, of the amplifiers 21 and 22 are of the same size. The multipliers 23 to 26 are connected in pairs with the input terminals D1 to D4. If the input terminal D1 is connected according to the arrangement of FIG. 2 with the torque-generating preset reference component $I_W^*$ of the stator current, i.e. the one perpendicular to the axis of the rotating field and the input terminal D2 is connected with the field-generating reference component $I_B{}^*$, i.e., the one preset parallel to the axis of the rotating field and if the field components $\sin\beta$ and $\cos\beta$ are fed to the input terminals D3 and D4, voltages will appear at the output terminals D5 and D6, which are proportional to the cosine and sine of the sum angle.

$$(\beta + \tan^{-1}[I_W{}^*/I_B{}^*])$$

where the sum of the squares of their magnitude corresponds to the sum of the squares of the magnitude of the input quantities $I_B{}^*$ and $I_W{}^*$. With this circuit connection of the vector rotator VD1, the interrelation given above is therefore realized.

Figure 4:
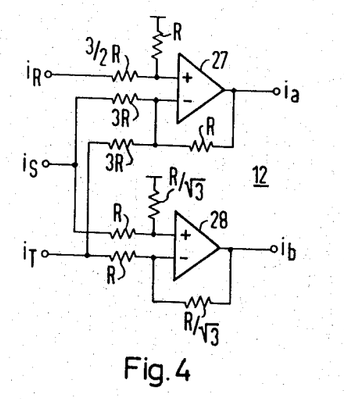
FIG. 4 illustrates a circuit diagram of a transformation circuit according to the invention for transforming the component voltages of a three-phase system into corresponding component voltages of a two-phase orthogonal system.

Referring to FIG. 4, the internal circuit design of the transformation circuits, designated 12 and 16 in FIG. 2, for transforming the component voltages of a three-phase system into corresponding component voltages of a two-phase orthogonal system, describe the same vector. The transformation circuit consists of two amplifiers 27, 28 to which the component voltages designated $i_R$, $i_S$ and $i_T$ are fed. The transformation is carried out by means of transformation rules known per se, for which purposes the load resistors of the amplifiers 27 and 28 have the resistance ratios indicated in FIG. 4. The stator-referenced actual-value components $i_a$ and $i_b$ of the vector of the stator current circulation I then appear at the output of the amplifiers 27 and 28.

Figure 5:
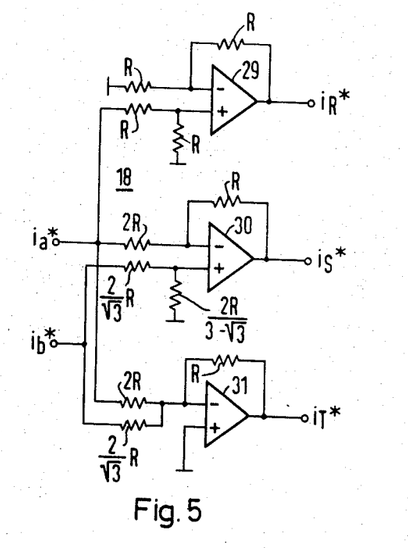
FIG. 5 illustrates a circuit for a transformation circuit to transform a biaxial orthogonal component system into a corresponding triaxial component system.

Referring to FIG. 5, the circuit designated 18 in FIG. 2 for the transformation of a biaxial orthogonal component system into a corresponding triaxial component system includes three amplifiers 29, 30 and 31 for such.

Figure 6:
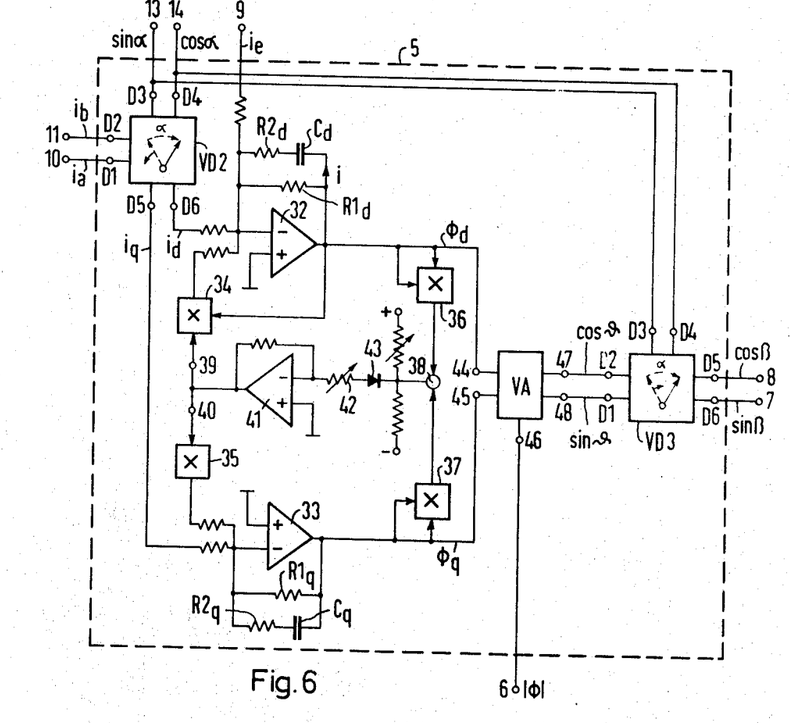
FIG. 6 illustrates a circuit diagram of a flux computer according to the invention.

Referring to FIG 6, the internal design of the flux computer 5 utilizes Park's method of splitting the armature circulation into two components wich are assumed to rotate with the rotor. In the following, the subscript $d$ is always used with reference to a component in the direction of the rotor axis P (see FIG. 1) and the subscript $q$ with reference to a component transverse to the rotor axis, i.e., in the direction of the pole gap axis.

First, the two stator-referenced orthogonal stator current components $i_a$ and $i_b$ arriving at terminals 10, 11 are delivered to terminals D1, D2 of a second vector rotator VD2 which is also fed two components $\sin\alpha$, $\cos\alpha$ determining the instantaneous rotor position via the terminals 13, 14 and input terminals D3, D4. These components $i_a$ and $i_b$ are then transformed by the vector rotator VD2 into two corresponding, but rotor referenced current components $i_d$ and $i_q$, which appear at the output terminals D5 and D6. The circuit-wise internal design of the vector rotator VD2 corresponds to the above described vector rotator VD1, but the input quantities $i_a$ and $i_b$ are fed to the input terminals D1 and D2 in such a manner that, as indicated in the block symbol of the vector rotator VD2, the stator current vector defined thereby is retarded by the angle of the rotor axis $\alpha$. Thus, at the output terminals D6 and D5, two components $i_d$ and $i_q$ appear which define the stator current vector in the $d$, $q$ coordinate system. The rotor referenced stator current components $i_d$ and $i_q$ are fed to the inputs of two differential amplifiers 32 and 33 which are used to simulate the field. The differential amplifier 32, which is provided for the simulation of the flux in the longitudinal direction of the rotor axis, is also fed a current $i_e$ proportional to the excitation current. This current $i_e$ is fed to the flux computer 5 at the input terminal 9.

The type of field simulation shown in FIG. 6 in the $d$, $q$ coordinate system is known through German published Patent Application 1,917,567 and will therefore be repeated here only with regard to its essential features. The differential amplifier 32 has three feedback paths:

one via the resistor $R1_d$, whose size corresponds to the value of the main inductance $1h_d$ of the field winding;

another via the series circuit of the resistor R2 and the capacitor $C_d$, which serves to simulate the damping circuit associated with the longitudinal axis; and another via a multipler 34 which can be provided to take into account the influence of saturation. If one denotes with $r_d$ the ohmic resistance of the damping circuit and with $1_d$ its stray inductance, with $R2_d$ the ohmic resistance and with $C_d$ the capacitance of the series circuit which provides negative feedback for the differential amplifier 32, it can be shown by setting the coefficient $r_d = 1/C_d$ and $1_d = R2_d$, that the differential amplifier 32 with its feedback circuit elements $R1_d$, $R2_d$ and $C_d$ simulates the differential equation for the field component $\phi_d$ extending in the longitudinal direction of the rotor axis, which in operator notation ($p = d/dt$) reads:

$$(\phi_d/i_d + i_e) = (1h_d\,(r_d + p1_d))/r_d + p(1h_d + 1_d)$$

For the differential amplifier 33, or the field component extending transversely to the longitudinal axis of the rotor the same analogous relation applies. It is essential that in this kind of field simulation, only a single respective amplifier is required to simulate the flux components $\phi_d$ and $\phi_q$ and that all parameters of the exciter and the damping windings can be adjusted independently of one another each by a separate component.

In order to simulate the influence of saturation, the output voltages $\phi_d$ and $\phi_q$, corresponding to the fluxes of the longitudinal and transversal axes, of the two differential amplifiers 32 and 33 are squared in a multiplier arrangement 36 and 37, respectively, and added in a mixing stage 38, for instance in the form of a summing amplifier, so that the square of the absolute value of the field vector composed of the two field components $\phi_d$ and $\phi_q$ is formed. The output of the mixing stage 38 acts via a threshold stage upon the inputs 39 and 40 of the multipliers 34 and 35 which are arranged in an additional feedback circuit of the amplifiers 32 and 33. The threshold stage consists of an amplifier 41 whose gain is adjustable through a variable input resistor 42 and in whose input circuit a biased threshold diode 43 is arranged, the cathode of which is connected to a voltage divider lying between a positive and a negative voltage. One resistor of this voltage divider is variable, so that it is possible to vary the conduction threshold. The two other inputs of the multipliers 34 and 35 are connected to the output voltages of the differential amplifiers 32 and 33. Thus, the output voltages of these multipliers 34, 35 act in a negative-feedback sense on the two field simulation amplifiers 32 and 33.

The saturation simulation described above functions as follows:

Up to a certain value of the resulting total flux, the response threshold of the diode 43 is not exceeded by the output voltage of the mixing stage 38. A zero voltage then exists at the inputs 39 and 40 of the multipliers 34 and 35 and no negative feedback takes place due to output signals of the multipliers 34 and 35. This corresponds to the unsaturated condition of the machine. If the response threshold of the diode 43 is exceeded, a square-law change of the degree of negative feedback takes place due to the multipliers 34 and 35 arranged in the negative-feedback paths. The actual magnetization characteristics can thereby be simulated. Thus, by changing the variable part of the voltage divider, the set-in point of the saturation can be set largely at will and with sufficient fidelity, and by varying the input resistor 43, the curvature of the magnetization curve in the saturated region can be similarly set. It is essential that in taking saturation into consideration one always starts out from the vectorial sum of the two field components $\phi_d$ and $\phi_q$.

The rotor referenced field component voltages $\phi_d$ and $\phi_q$ are now fed to the input terminals 44 and 45 of a vector analyzer VA, which has the purpose of forming at its output terminal 46, a voltage proportional to the absolute value of the field vector, and at its output terminals 47 and 48 a voltage proportional to the sine and cosine of the angle between the rotor axis P and the flux axis F (c.f. FIG. 1). The two component voltages at the outputs 47 and 48 would then define in the $d, q$ coordinate system, a unit vector which always points in the direction of the rotating field. By means of a further vector rotator VD3, which is loaded on the input side in the manner of the vector rotator VD1 and therefore causes an advance of the vector fed to its terminals D1 and D2, two voltages are finally obtained at its output terminals D5 and D6 which are proportional to the cosine and sine of the angle $\beta$ which encloses the rotating-field axis F and the coordinated axis a which is fixed with respect to the stator.

Figure 7:
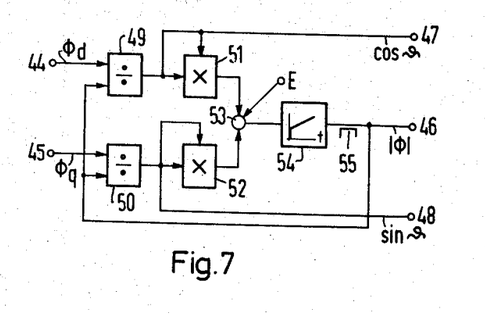
FIG. 7 illustrates a circuit diagram of a vector analyzer used in the flux computer of FIG. 6.

Referring to FIG. 7, the vector analyzer VA consists of two quotient generator 49 and 50, whose dividend inputs are connected with the terminals 44 and 45, to which voltages proportional to the respective orthogonal components $\phi_d$ and $\phi_q$ of the rotating-field vector $\phi$ are applied. The outputs of the quotient generators 49 and 50 are squared by means of two multipliers 51 and 52, the outputs of which are added in a mixing stage 53. The input of this mixing stage 53 is further fed, subtractively, with a constant voltage E. This voltage E is a voltage with the magnitude 1, i.e., a so-called unit voltage. The output of the mixing stage 53 drives an integrator in the form of a PI (proportional-integrator) control 54, whose output is connected with the divisor inputs of the quotient generators 49 and 50. For reasons of stability, the PI control 54 is provided with a limit device 55, for instance, in the form of a limiting diode, which limits the output voltage of the integrator on one side to zero and thus allows only positive values of this output voltage.

If the output quantity of the PI control 54 is designated with $x$, and if one takes into consideration the known fact that the output quantity of a PI control stops changing only when the sum of its input quantities vanishes, the vector analyzer VA reaches its stationary, i.e., the balanced state, when the following relation applies:

$$(\phi_d/x)^2 + (\phi_q/x)^2 = E = 1.$$

The output quantity of the proportional integrator 54 then corresponds exactly to the absolute value $|\phi|$ of the rotating-field vector. In this automatically produced stationary condition, voltage appear at the terminals 47 and 48, which are connected with the outputs of the quotient generators 49 and 50, of the magnitude $$|\phi_d| \; \phi\varphi = \cos \text{ and } \phi_q \; |\phi| = \sin\varphi$$

Voltages can therefore be taken off at the output terminals 46 to 48, which are proportional to the absolute value of the rotating field vector, as well as to the sine and cosine of its angle $\varphi$ in the $d, q$ coordinate system.

Figures 8, 9:
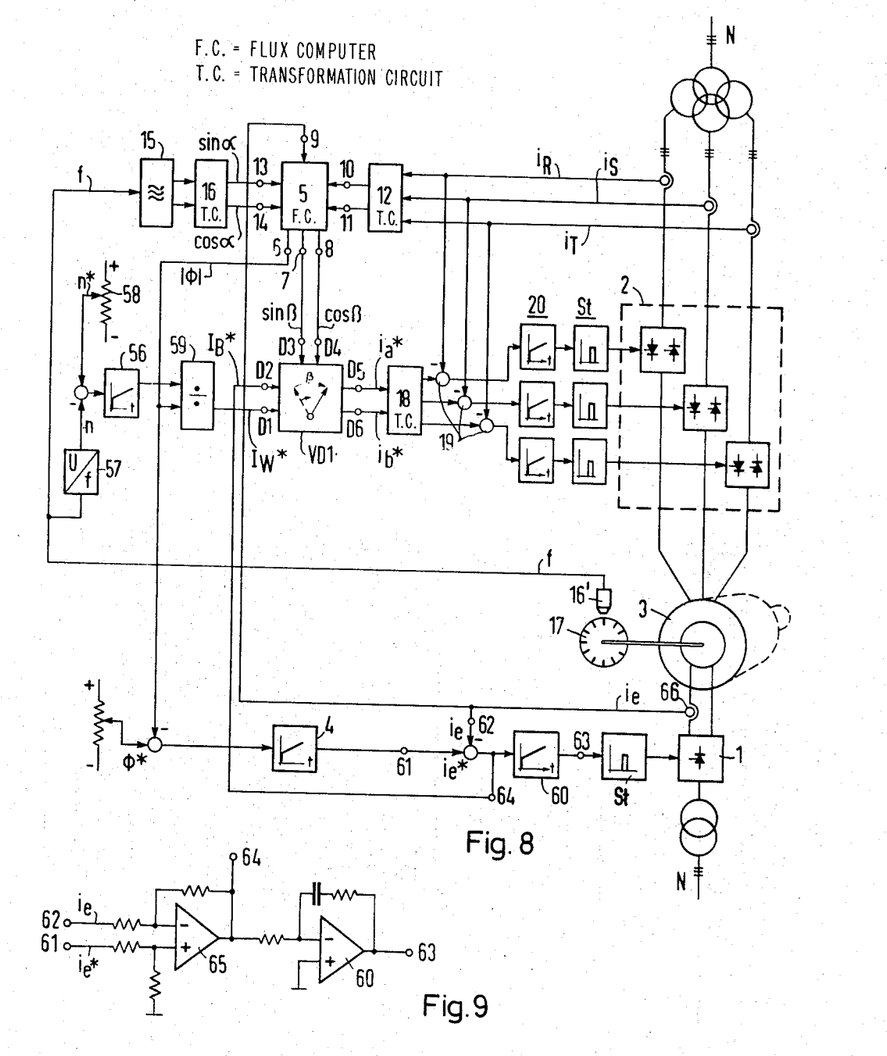
FIG. 8 illustrates a block diagram of a field-oriented control system according to the invention for a transmissionless tubular mill drive.
FIG. 9 illustrates a circuit for a current regulator according to the invention.

Referring to FIG. 8, wherein like reference characters indicate like parts as above, an example of an embodiment of the invention is shown, which is specifically designed for the speed control of a transmissionless tubular mill drive. The synchronous machine 3, which is constructed in the form of a ring motor and whose rotor is mounted directly on the grinding drum, is fed from the three-phase system N via a direct converter 2, which consists of three piars of three-phase bridge circuits which are connected in anti-parallel and contain thyristors, of which each pair is assigned to one stator phas connection. The thyristors are triggered by means of control units St, which are appropriately driven by the phase current controls 20. The arrangement according to FIG. 8 is essentially the same as that of FIG. 2, with the addition that to the torque control shown in FIG. 2, a speed control 56 is superimposed whose output signal determines the reference-value component $I_w*$ which is perpendicular to the rotating-field axis F. The actual value of the speed control 56 is obtained from a frequency-voltage converter 57 which is supplied on an input side with a pulse sequence from the pulse generator 16'. The reference value of the speed control 56 is tapped off at a potentiometer 58 as a d-c voltage which can be preset at will. In order to keep the control loop gain constant, regardless of possible fluctuations of the magnitude of the rotating-field vector, it is adviseable to have the output signal of the speed control 56 act not directly on the active-current reference input D1 of the vector rotator VD1, but instead via a quotient generator 59, whose divisor input is connected with the output terminal 6 of the flux computer 5 and thereby obtains a signal which is proportional to the absolute value $|\phi|$ of the rotating-field vector.

For the dynamic improvement of the flux control, an excitation current regulator 60 is subordinated to the flux control 4 in such a manner that the output signal of the flux control 4 constitutes the reference value $i_e*$ of the excitation current regulator 60. The actual value of the excitation current $i_e$ is supplied by a d-c converter 66 arranged in the exciter circuit, which is connected on the secondary side also to the input terminal 9 of the flux computer 5.

The field-oriented pre-setting of the stator current components opens up the possibility of assisting the excitation current control, which naturally has a large time constant, in the event of load jumps, i.e., when going from one stationary state to another, and of achieving thereby a more rapid transition while avoiding, in particular, undesireable overvoltages. To this end, the control deviation, which properly should be removed by the excitation current regulator 60, i.e., the difference between the excitation current reference value $i_e^*$ and the actual excitation current value $i_e$, is fed via a terminal 64 to the input D2 of the vector rotator VD1, which determines the stator current reference component that is parallel to the field. In the stationary condition, the input quantity of the excitation current regulator 60 is zero, and therefore also the field-parallel component of the stator current; the synchronous machine being operated with $\cos \varphi = 1$. If however, for instance, due to load jumps, a temporary decrease or increase of the flux of the machine occurs (which the flux control attempts to compensate but cannot do so fast enough because of the relatively large inertia of the excitation current control circuit subordinated thereto), a control deviation will temporarily appear at the input of the excitation current regulator 60. This produces, via the input D2 of the vector rotator VD1, a stator current component parallel to the field which acts in the same sense as the output signal of the excitation current regulator 60, and aids the signal in this manner.

Referring to FIG. 9, the excitation current regulator 60 and the input circuit assigned thereto are fed the reference and the actual value of the excitation current via input terminals 61, 62. These terminals 61, 62 are connected to the input of a differential amplifier 65 so that any difference between the reference value and actual value of the excitation current can be obtained therein. The output of the differential amplifier 65 is connected with the input of the regulator 60 as well as with the terminal 64 which, in turn, is connected with the input terminal D2 of the vector rotator VD1, as shown in FIG. 8. The voltage output of the regulator 60 is then passed to the terminal 63 of a control unit St, as above, and thence to the converter 1.

What is claimed is:

1. A method of controlling a converter fed automatically controlled synchronous machine having a rotor and stator comprising the steps of:
   a. ascertaining the sine and cosine of the instantaneous angular position $\beta$ of the rotating field axis F of the machine with respect to a stator axis system;
   b. providing two independently variable reference value components ($I_W^*$) and ($I_B^*$) referenced to the rotating field axis F, $I_W^*$ being a component perpendicular to said axis F and $I_B^*$ being a component parallel to said axis F; and
   c. using the values of $\sin\beta$ and $\cos\beta$ to transform said components $I_W^*$ and $I_B^*$ into components in said stator axis system to control the vector I of the stator circulation current.

2. In a method as set forth in claim 1 wherein said two components of said rotating-field axis are ascertained directly.

3. In a method as set forth in claim 1 wherein said two components of said rotating-field axis are field simulated.

4. In a method as set forth in claim 3 the steps of determining the instantaneous position ($\alpha$) of the rotor axis and forming two orthogonal components ($\sin\alpha$, $\cos\alpha$) determinitive thereof;
   obtaining two stator-referenced orthogonal stator current components ($i_a$, $i_b$);
   forming two rotor-referenced stator current components ($i_d$, $i_q$) from said two orthogonal components ($\sin\alpha$, $\cos\alpha$) and said two stator-referenced orthogonal stator current components ($i_a$, $i_b$);
   subsequently field simulating said rotor-referenced stator current components ($i_d$, $i_q$) to form two rotor-referenced orthogonal field components ($\sin\varphi$, $\cos\varphi$); and
   thereafter combining said rotor-referenced orthogonal field components ($\sin\varphi$, $\cos\varphi$) and said orthogonal components ($\sin\alpha$, $\cos\alpha$) determining the instantaneous position of the rotor axis to form said two components ($\sin\beta$, $\cos\beta$) determining said position of the rotating-field axis (F).

5. In an apparatus for controlling a converter-fed automatically controlled synchronous machine having a rotor and a stator;
   at least one vector rotator for transforming two components ($\sin\beta$, $\cos\beta$) determining the instantaneous angular position of the rotating-field axis (F) of the machine and two independently variable reference-value components ($I_W$, $I_B$) into two stator-referenced orthogonal stator current components ($i_a$, $i_b$), one of said stator current components being perpendicular to said axis and the other of said stator current components being parallel to said axis, said vector rotator including two summing amplifiers and four multipliers having outputs connected in pairs to a respective input of one each of said amplifiers.

6. In an apparatus as set forth in claim 5 a flux computer (5) including a pair of differential amplifiers (32, 33) and a negative feedback circuit including resistors therein connected to each said differential amplifier for field simulation said two components determining the position of said rotating-field axis; one of said amplifiers receiving a stator current component ($i_d$) disposed in the direction of the rotor axis (P) and a quantity ($i_e$) proportional to the excitation current, and the other of said amplifiers receiving a stator current component ($i_q$) disposed perpendicularly of the rotor axis.

7. In an apparatus as set forth in claim 6 wherein said machine has a damper winding, each said negative feedback circuit connecting an output of a respective amplifier to an input thereof and including a capacitor and a resistor therein in series.

8. In an apparatus as set forth in claim 7 wherein said flux computer further has means (36, 37, 38) for squaring and summing the output signals of each differential amplifier to produce an output signal, a threshold stage (41–43) for receiving said output signal and a pair of multipliers (34, 35) each multiplier being connected between each differential amplifier and said threshold in a second feedback circuit to receive a signal from said threshold.

9. In an apparatus as set forth in claim 8 wherein said flux computer (5) further includes
   a vector analyzer for receiving the output of said differential amplifiers; said vector analyzer having two quotient generators (49, 50) for producing output voltages, means (51, 52) for squaring said output voltages, means (53) for summing said squared output voltages and comparing said summed output voltages with a constant quantity (E), and an integrating control (54) for receiving a compared voltage from said latter means, said integrating control being connected to said quotient generators to deliver an output voltage to said generators as a divisor input; and a vector rotator connected to said vector analyzer to receive said output voltages of said quotient generators.

10. In an apparatus as set forth in claim 9 wherein said flux computer (5) further has a second vector rotator (VD2) therein, a pulse disc (17) coupled to said rotor, a pulse generator (16') connected with said pulse disc, a digitally operating three-phase generator (15) operatively connected to said pulse generator to be driven thereby, and a transformation circuit (16) connected to said three-phase generator for receiving and transforming three output voltages therefrom into said two components ($\sin\alpha$, $\cos\alpha$) determining the instantaneous angular position of said rotor axis (P), said transformation circuit being connected to said second vector rotator to deliver said latter two components thereto prior to field simulation.

11. In an apparatus as set forth in claim 5 further having a transformation circuit (18) connected to said vector rotator (VD1) to receive stator-referenced current components ($i_a^*$, $i_b^*$) corresponding to field-oriented reference-value components ($I_W^*$, $I_B^*$); three phase current regulators connected to said transformation circuit to each receive an actual value input; three control units each respectively connected to one of said regulators to transfer a triggering signal from said regulator, three stator phase leads connected to said stator, and a thyristor disposed in each stator phase lead and connected to a respective control unit.

12. In an apparatus as set forth in claim 11, a speed control (56) connected to said rotor to produce a field-oriented reference value component ($I_W^*$) perpendicular to the rotating field axis (F).

13. In an apparatus as set forth in claim 12, a quotient generator (59) having a dividend input connected to said speed control, a divisor input for receiving a quantity proportional to the absolute value ($|\phi|$) of the rotating-field vector, and an output for emitting said field-oriented reference value component ($I_W^*$) perpendicular to the rotating-field axis (F).

14. In an apparatus as set forth in claim 12, a pulse generator (16') connected to said rotor, a frequency-voltage converter (57) connected between said pulse generator and said speed control and having an output connected to an actual-value input of said speed control.

15. In an apparatus as set forth in claim 14, a flux control (4) for controlling the rotor excitation, said flux control receiving a quantity proportional to the absolute value of the rotating-field vector as an actual value.

16. In an apparatus as set forth in claim 15, an excitation current regulator (60) subordinated to said flux control (4).

17. In an apparatus as set forth in claim 16 wherein said excitation current regulator (60) receives an input signal determining said field-oriented reference-value component ($I_B^*$) parallel to the rotating field axis (F).

* * * * *